Aug. 29, 1967  F. J. TOLLEY ETAL  3,338,313
CONSTANT SPEED VARIABLE PITCH PROPELLER
Filed July 11, 1966
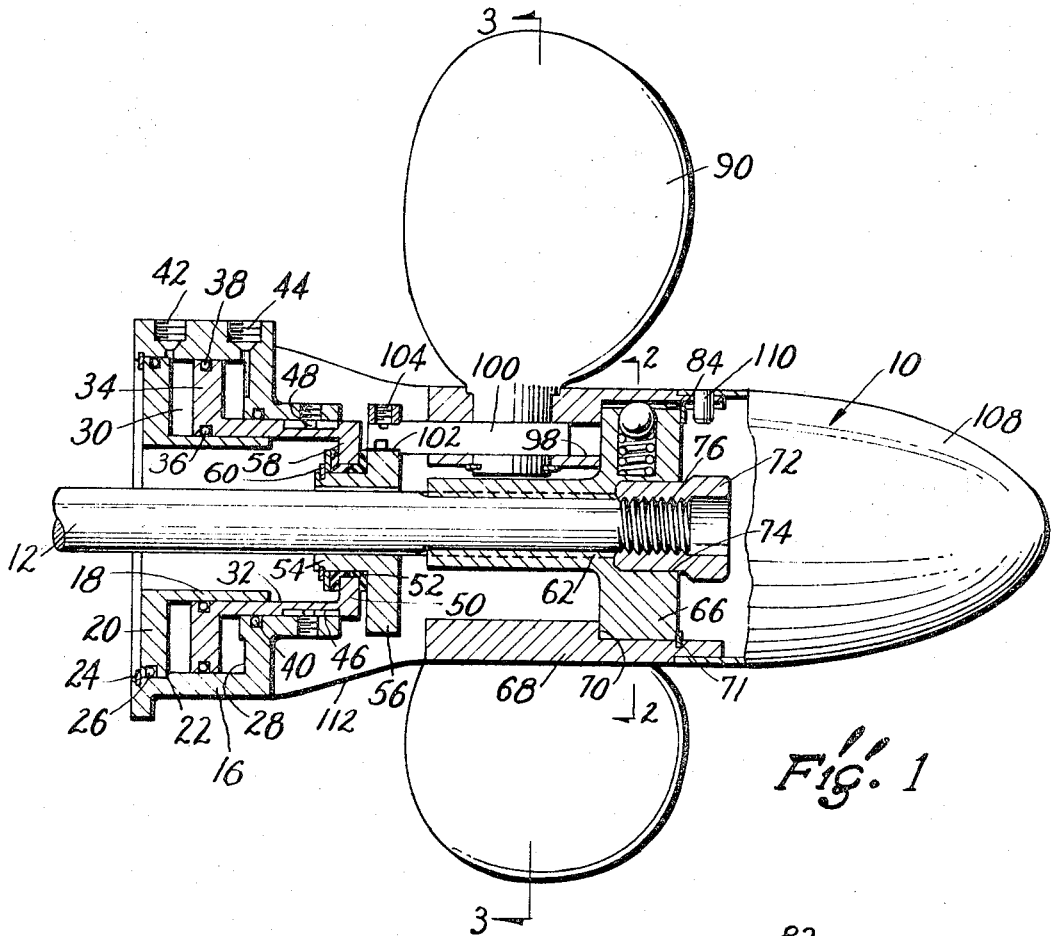
Fig. 1
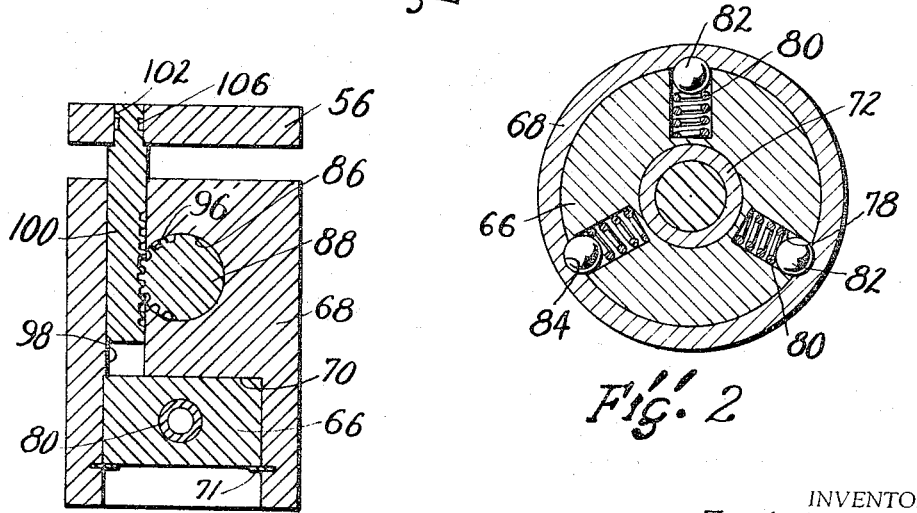
Fig. 4
Fig. 2
INVENTORS
Fred J. Tolley
Ivor L. Pearce
BY
William S. Dorman
ATTORNEY Aug. 29, 1967   F. J. TOLLEY ETAL   3,338,313
CONSTANT SPEED VARIABLE PITCH PROPELLER
Filed July 11, 1966   2 Sheets-Sheet 2

INVENTORS
Fred J. Tolley
Ivor L. Pearce
BY
William S. Dorman
ATTORNEY

United States Patent Office 3,338,313
Patented Aug. 29, 1967

3,338,313
CONSTANT SPEED VARIABLE PITCH PROPELLER
Fred J. Tolley and Ivor L. Pearce, Tulsa, Okla.; said Pearce assignor to Stewart-Pearce Engineering Company, Tulsa, Okla., a partnership
Filed July 11, 1966, Ser. No. 564,187
3 Claims. (Cl. 170—160.37)

This invention relates to improvements in propeller devices and more particularly, but not by way of limitation, to a constant speed variable pitch propeller assembly for use in connection with marine engines of the outboard, inboard, or inboard-outboard type.

The usual propeller structure of today utilized in connection with marine engines is normally provided with single pitch blades which are engineered or designed to produce maximum operating efficiency for the engine at some preselected operating speed or r.p.m. of the engine. The most desirable engine r.p.m. is usually selected or determined through a relationship with the horsepower of the engine and the size and configuration of the boat or water craft with which the engine is designed for use. Of course, during operation of a boat or craft, it is usually desirable to travel or maneuver the boat at many variable speeds and under many different conditions. With the use of a propeller having uncontrolled or single pitch blades, the operating speed of the engine must usually be varied to provide the desired changes in maneuvering for the changing conditions and as a result the propeller and engine are seldom operating at peak or optimum efficiency.

The present invention contemplates a novel propeller for marine engines which is particularly designed and constructed for maintaining a constant engine r.p.m. by automatically varying the pitch or angle of the propeller blades during operation of the engine. For example, the angle of the blades may be selected such that the propeller will be effective in the water for driving or moving the boat forward in the water at substantially great speeds, or the blade pitch may be alternatively selected during operation of the engine so that the blades will be substantially ineffective in the water for moving the boat. The rotational speed of the output shaft of the engine is in no manner altered during the change of pitch operation, and thus, the speed or r.p.m. of the engine may be maintained constant throughout the entire operating speed thereof, from starting positions through cruise speeds, at high speeds, or at low speeds, or at any range of speed therebetween. This controlled variation of blade pitch for the propeller results in a substantially instantaneous change of blade angle to maintain a maximum operating efficiency of any engine-boat-propeller combination throughout the operating range of the engine. In other words, the angle of the propeller blades is altered or changed constantly during operation of the engine thereby providing maximum efficiency for any given or selected engine r.p.m. and engine horsepower or boat load condition. In addition, means is provided in the propeller assembly for releasing the driving or rotational driving engagement between the propeller blades and the output or drive shaft of the engine upon accidental entanglement of the blades or engagement of the blades with exterior debris, or other objects, thus greatly reducing the possibility of accidental breakage of the output shaft. The constant speed variable pitch propeller assembly may be readily secured to substantially any existing marine engine, whether of the outboard, inboard, or inboard-outboard type, with a minimum of alteration required to the structure of the existing engine.

It is an important object of this invention to provide a propeller assembly for marine engines which is particularly designed and constructed for maintaining a constant engine speed for maximum operating efficiency in accordance with substantially any engine-boat-propeller combination throughout the entire range of operating speeds for a water craft.

It is another object of this invention to provide a constant speed propeller assembly for marine engines wherein the pitch of the propeller blades is automatically adjusted for maintaining a constant engine speed during operation of a water craft.

Another object of this invention is to provide a constant speed variable pitch propeller assembly for marine engines which may be readily secured to substantially any existing marine engine with a minimum of alteration to the engine structure.

A further object of this invention is to provide a constant speed variable pitch propeller assembly wherein driving engagement between the propeller blades and the engine drive or output shaft is released upon accidental engagement of the blades with an exterior object for greatly reducing the possibility of damage or breakage of the engine output shaft.

A still further object of this invention is to provide a constant speed variable pitch propeller assembly which is simple and efficient in operation and economical and durable in construction.

Other and further objects and advantageous features of the present invention will hereinafter more fully appear in connection with a detailed description of the drawings in which:

FIGURE 1 is a side elevational view, partly in section, of a propeller assembly embodying the invention.

FIGURE 2 is a sectional view taken on line 2—2 of FIGURE 1.

FIGURE 4 is a sectional view taken on line 4—4 of FIGURE 3.

Figure 5:
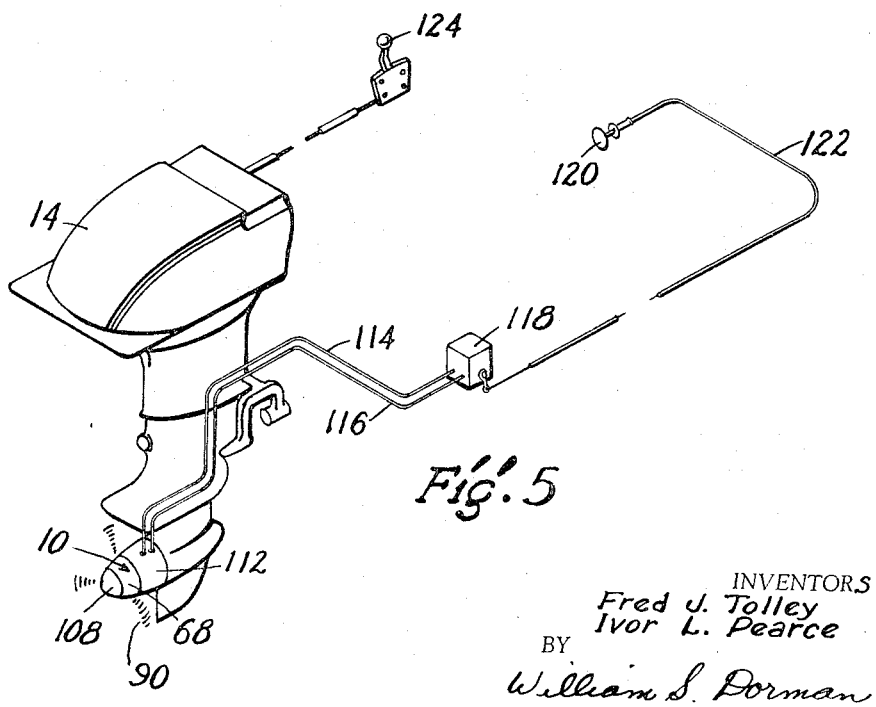
FIGURE 5 is a perspective view of a propeller assembly embodying the invention secured to an outboard marine engine with the control system therefor depicted schematically.

Referring to the drawings in detail, reference character 10 generally indicates a propeller assembly adapted to be secured to the output or drive shaft 12 of a marine engine 14 (FIGURE 5). Whereas the engine 14 depicted herein is of the outboard type, it is to be understood that the device 10 may be utilized with substantially any type of marine engine, such as the outboard type, the inboard type, or the inboard-outboard type.

The propeller assembly 10 comprises a substantially cylindrical housing 16 adapted to be disposed around the shaft 12 and secured directly to the engine 14 in any suitable manner (not shown). A cylindrical sleeve 18 is disposed within the housing 16 and is provided with an outwardly extending circumferential flange 20 which bears against a first inwardly directed annular shoulder 22 provided on the inner periphery of the housing 16. The sleeve 18 is securely retained in position against the shoulder 22 by a suitable locking washer or ring 24, as is well known, and a sealing member 26 is interposed between the outer periphery of the flange 20 and the inner periphery of the housing 16 to preclude leakage of fluid therebetween. The housing 16 is reduced at 28 to form a second inwardly directed annular shoulder which is spaced from the first shoulder 22 to provide a chamber 30 between the flange 20 and shoulder 28.

A substantially cylindrical piston 32 is slidably disposed between the sleeve 18 and housing 16, and is provided with an outwardly directed circumferential flange or piston head member 34 on one end thereof which is slidably disposed within the chamber 30. A first sealing member 36 is provided on the inner periphery of the piston head 34 for precluding leakage of fluid between the head 34 and the sleeve 18, and a second sealing member 38 is provided on the outer periphery of the head 34 for precluding leakage of fluid between the head 34 and the housing 16. An additional sealing member 40 is preferably interposed between the reduced portion of the housing 16 and the outer periphery of the piston 32 for precluding leakage of fluid therebetween. A pair of spaced ports 42 and 44 are provided in the housing 16 for communication with the chamber 30 for a purpose as will be hereinafter set forth.

A plurality of circumferentially spaced sots or recesses 46 are provided on the outer periphery of the piston 32. A plurality of radially inwardly extending pin members 48 are removably secured to the reduced portion of the housing 16 and each pin 48 extends into one of the recesses 46 as clearly shown in FIGURE 1. The pins 48 cooperate with the respective slots 46 for precluding relative rotation between the housing 16 and piston 32 while permitting relative longitudinal or sliding movement of the piston with respect to the housing 16. The end of the piston 32 which is oppositely disposed from the head member 34 is provided with an inwardly directed circumferential flange 50 which engages a bearing member 52, as particularly shown in FIGURE 1. The bearing member 52 may be of any suitable configuration and may be constructed from any suitable material. As depicted herein the bearing 52 is preferably constructed from Teflon, or the like, and comprises a pair of oppositely disposed substantially annular members having an L-shaped cross-sectional configuration for engaging the opposed sides of the flange 50.

The bearing 52 is disposed around the outer periphery of a flanged retaining ring or sleeve 54. It will be apparent that one of the half-portions of the bearing 52 is retained in position on the ring 54 by engagement between the flange 50 and flange 56 of the ring 54, and the other half-portion of the bearing 52 may be retained in position on the ring 54 in any suitable manner, such as by a retaining washer 58 and cooperating lock ring 60. The retaining sleeve 54 is loosely disposed around the output shaft 12 and is thus free to move longitudinally or reciprocally with respect thereto simulaneously with the reciprocal movement of the piston 32, as will be hereinafter set forth.

Figure 3:
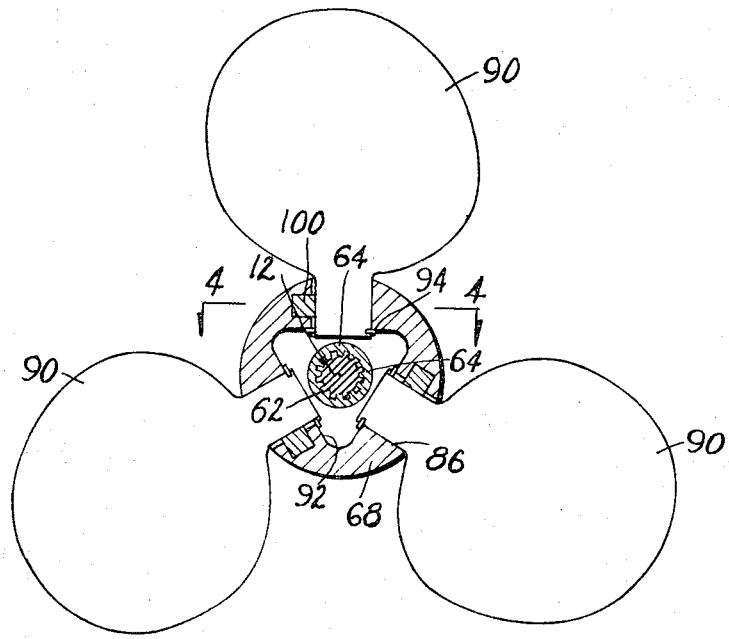
FIGURE 3 is a sectional view taken on line 3—3 of FIGURE 1.

The outer end of the shaft 12 is splined or provided with a plurality of longitudinally extending circumferentially spaced teeth as shown at 62 in FIGURES 1 and 3. A complementary internally splined housing or sleeve 64 is disposed on the spline portion 62 of the shaft 12 and the cooperating splines transmit rotation from the shaft 12 to the housing 64 for a purpose as will be hereinafter set forth. An outwardly extending circumferential flange 66 is provided at the outer end of the sleeve 64 and an outer sleeve 68 is disposed around the flange 66 and sleeve 64. An inwardly directed radial shoulder 70 is provided on the inner periphery of the outer sleeve 68 for receiving the flange 66 thereagainst. The flange 66 is retained in position against the shoulder 70 by means of a suitable locking ring 71, or the like, and the outer sleeve 68 normally rotates simultaneously with the housing 64 as will be hereinafter set forth. A suitable cap screw or nut 72 extends through a central bore 74 of the housing 64 for threaded engagement at 76 with the outer end of the shaft 12 for retaining the housing 64 in position thereon.

A plurality of circumferentially spaced, radially inwardly extending bores 78 are provided around the outer periphery of the flange 66. A suitable helical spring member 80 is disposed in each bore 78 for yieldably supporting a ball member 82. A plurality of circumferentially spaced detents or recesses 84 are provided on the inner periphery of the outer sleeve 68 surrounding the flange 66 and spaced complementary with the spacing of the bores 78 whereby in one relative position between the flange 66 and sleeve 68 a detent 84 will be disposed in substantial alignment with each of the bores 78. Thus, each spring 80 will urge its respective ball 82 into the aligned detent 84. The engagement of the balls 82 with the detents 84 transmits rotation from the housing 64 to the sleeve 68. However, if the outer sleeve 68 encounters any resistance to free rotation, as will be hereinafter set forth, the force of the springs 80 will be overcome whereby the rotation of the flange 66 will move the balls out of the respective detents, and the flange 66 will rotate freely within the outer sleeve 68, thus protecting the shaft 12 from breakage due to excessive torque which might arise when external forces interrupt the rotation of the outer sleeve 68.

The outer sleeve 68 is provided with a plurality of circumferentially spaced radial bores 86 each for receiving the shank 88 of a suitable propeller blade 90 therein. Whereas the propeller assembly 10 depicted herein is provided with three propeller blades 90, it is to be understood that substantially any desired number of the blades may be provided. The internal or central bore 92 of the sleeve 68 as shown in FIGURE 3 is preferably of a substantially triangular configuration whereby a substantially flat surface will be provided conterminous with the inner end of each bore 90. Of course, if a different number of blades are provided, it may be desirable to alter the configuration of the central bore 92. Each blade shank 88 is rotatably disposed within the respective bore 86 and is retained therein by means of a lock washer 94, or the like, as is well known. Each shank 88 is provided with a toothed portion 96 (FIGURE 4) extending around at least a portion of the outer periphery thereof for facilitating transmitting of rotation to the blades within their respective bores 86, as will be hereinafter set forth in detail.

The outer sleeve 68 is provided with a plurality of circumferentially spaced longitudinally extending bores 98 each for receiving a reciprocal rack member 100 therein. It is preferable to provide a rack 100 for each blade shank 88, and the bores 98 extend through the sleeve to the shoulder 70 in such a manner that each longitudinal bore 98 is open to one of the radial bores 86, as will be particularly seen in FIGURE 4. Each rack 100 engages the teeth 98 of the shank 88 disposed in its respective bore 86, and reciprocation of the rack will rotate the respective shank within the respective bore. For example, as shown in FIGURE 4, movement of the rack 100 in a downward direction will cause the shank 88 to rotate in a counterclockwise direction whereas movement of the rack 100 in an upward direction will rotate the shank 88 in a clockwise direction.

The flange 56 of the retaining ring 54 is provided with a plurality of spaced bores 102 (FIGURE 1) which extend therethrough. Each of the bores 102 is disposed in substantial alignment with one of the bores 98 for receiving the outer end of a rack 100 therein. Each rack 100 is secured in its respective bore 102 by a set screw or locking pin 104, or the like, whereby the racks 100 move simultaneously with the retaining sleeve 54. Each pin 104 extends into engagement with an annular groove 106 provided in the respective rack 100.

A front fairing 108 is disposed around the fore portions of sleeve 68 and flange 66, and may be secured to the sleeve 68 in any well known manner, such as by a plurality of pins 110 (FIGURE 1). A rear fairing 112 is interposed between the sleeve 68 and housing 16 and may be secured therebetween in any suitable manner for covering the portions of the assembly 10 disposed therebetween.

The ports 42 and 44 are connected with any suitable source of fluid, such as hydraulic fluid, through the hydraulic lines 114 and 116, respectively. The hydraulic lines 114 and 116 are preferably supplied with the fluid through a suitable governor 118 which automatically controls the fluid as is well known, but it is to be understood that the propeller assembly 10 may be actuated manually without the use of a governor, if desired. The governor 118 is preferably driven by the engine 14, or by an electric motor (not shown) which in turn is controlled by ignition points. A push-pull type propeller control knob 120 is connected with the governor 118 by a suitable line 122, as is well known. Of course, the usual throttle 124 may be provided for the engine 14, and a suitable manifold pressure or vacuum gauge (not shown) and tachometer (not shown) may also be provided, if desired.

*Operation*

During use of the marine engine 14, the output shaft 12 rotates continuously, and the rotation of the shaft 12 is transmitted to the housing 68 through the engagement of the balls 82 with the respective detents 84. The rotation of the housing 68 spins the blades 90 in the usual manner to provide the propelling power for the boat or craft (not shown) in the water.

The governor 118 supplies a hydraulic fluid to the propeller apparatus 10 alternately through the lines 114 and 116, as is well known, and the ports 42 and 44 direct the fluid into and out of the chamber 30 to provide reciprocation for the piston 32. For example, when the fluid is admitted into the chamber 30 through the port 42 and simultaneously withdrawn through the port 44, pressure on the left side of the piston head 34, as viewed in FIGURE 1, will build up and the pressure on the right hand side thereof will decrease to cause the piston 32 to move in a right hand direction, or toward the blades 90. The forward movement of the piston 32 is transmitted to the retaining sleeve 54 through the flange 50 and bearing 52 as hereinbefore set forth. The right hand movement of the flange 56 moves the rack 100 simultaneously in a right hand direction whereby each blade 90 is simultaneously rotated within its respective bore 86 for altering the angle or pitch of each blade. It will be apparent that each blade will thus be rotated through substantially identical arcs whereby the pitch of the blades will be changed in a synchronized manner.

Conversely, when the fluid is admitted into the chamber 30 through the port 44 and simultaneously withdrawn from the port 42 the pressure on the right hand side of the piston head 34 will increase and the pressure on the left hand side thereof will decrease. The piston head 34 will then move in a left hand direction for moving the racks 100 simultaneously therewith in a left hand direction. The engagement between the racks 100 and respective teeth 96 will rotate the blades 90 in an opposite direction from that aforesaid whereby the pitch of the blades 90 will be altered to produce the desired reaction thereof in the water. Of course, the pitch of the blades may be altered in this manner to achieve the desired performance of the boat in the water without altering the speed of rotation of the output shaft 12. Of course, the blades may also be used to provide a braking action for the craft, and a reverse movement therefor.

In the event the blades 90, or any other external portion of the housing 68 becomes entangled with debris, or any other forces tend to stop the rotation of the housing 68, the force created by the rotation of the flange 66 will overcome the force of the springs 80 whereby the balls 82 will be disengaged from the respective detents 84, thus permitting rotation of the sleeve 64 and shaft 12 independently from the outer sleeve 68. This will greatly reduce the possibility of breakage or shearing of any of the blades for providing protection therefor and will minimize any breakage of the shaft 12 from excessive torque or the like. Of course, when the external forces tending to stop the rotation of the sleeve 68 are removed or cease, the continued rotation of the flange 66 will move the balls 82 back into engagement with the detents 84 whereby rotation will once again be transmitted to the outer sleeve 68.

The Teflon or plastic material from which the bearing 52 is constructed is well known for its self-lubricating qualities and substantially precludes the need of any lubrication being added thereto. In addition, it is preferable to provide a suitable dry lubricant on the outer periphery of each blade shank 88 which may be plated thereon in any well known manner for eliminating the need of further lubrication. As a result, the propeller unit requires no additional lubrication which is of great advantage in this type of marine engine utilization. The inherent action of the adjustable blades permits the propeller unit 10 to sense any variation or change in drag such as may be produced by increased wind pressure or a shift in load conditions in the craft whereby the pitch angle of each blade is automatically adjusted to the best or optimum position for the particular condition under which the craft is operating. This is a protection to the engine in that lugging of the engine is substantially eliminated which minimizes any damage to rod bearings, main bearings, pistons, rings, valves and other engine parts. This same ability of the propeller unit 10 to sense a reduction or increase in load or drag of the craft and the automatic and instantaneous pitch change of the blades substantially eliminates cavitation which results in a maximum fuel economy for engine operation.

From the foregoing it will be apparent that the present invention provides a novel propeller assembly for utilization in combination with a marine engine in order to maintain a constant engine speed by automatically varying the pitch of the propeller blades in accordance with the desired performance of the water craft. The novel constant speed variable pitch propeller results in a maximum efficiency of operation of the engine throughout the entire range of speed of the engine, from the starting position to cruise speed, or at high speeds, or low speeds, or any range of speed therebetween. In addition, ball and detent means is provided for cooperation between the constantly rotating output shaft of the engine and the blade carrying sleeve whereby the shaft may rotate independently of the sleeve upon accidental stoppage of the rotation of the sleeve, thus substantially precluding breakage of the shaft from excessive torque conditions. The novel propeller assembly is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A propeller assembly for a marine engine having an output shaft and comprising a first housing secured to the shaft for rotation simultaneously therewith, said first housing including an outwardly extending circumferential flange carrying spring biassed ball members, a second housing disposed around the first housing and having shoulder means and locking ring means defining a circumferential recess for receiving said flange, detents in said recess for receiving said ball members carried by said flange, said ball members and detents cooperating to transmit rotation from the first housing to the second housing, blade means carried by the second housing and rotatable simultaneously therewith, reciprocal means disposed around the shaft and longitudinally movable with respect thereto, said reciprocal means comprising a reciprocal sleeve member disposed around the output shaft and spaced longitudinally from said first housing, said reciprocal sleeve member being provided with an outwardly extending circumferential flange, a plurality of circumferentially spaced rack members carried by the flange and extending outwardly therefrom into the second housing, piston means disposed around the shaft and engageable with the reciprocal means for transmitting said longitudinal movement thereto, said piston means including a cylindrical piston body having an inwardly directed circumferential flange provided at one end thereof and an outwardly directed circumferential flange provided at the opposite end thereof, said inwardly directed flange adapted for transmitting reciprocal movement to the reciprocal sleeve, said outwardly directed flange providing a head member for the piston, cylinder means containing said head member, self-lubricating bearing means interposed between the reciprocal sleeve and the inwardly directed flange, means cooperating with the piston means to provide reciprocation thereof in accordance with operational requirements of the engine, and means cooperating between the rack members of reciprocal means and the blade means for altering the pitch of the blades in accordance with the operational requirements of the engine.

2. A propeller assembly as set forth in claim 1 wherein the blade means comprises a plurality of substantially identical blade members, each of said blade members having a shank thereon, said shank members being rotatably secured to said second housing, teeth means provided on the outer periphery of the shank members and extending around at least a portion of the outer circumference thereof and engageable by said rack members for rotation of the blade members with respect to the second housing to provide said altering of the pitch of the blades.

3. A propeller assembly as set forth in claim 1 wherein the cylinder means comprises an inner substantially cylindrical flanged sleeve member disposed around the shaft, an outer independent substantially cylindrical housing disposed around the inner sleeve for receiving the piston therebetween, said outer housing having an enlarged portion for cooperation with the flange of the inner sleeve to provide a sealed chamber for receiving the piston head member therein, and means provided in the outer housing for alternately injecting and withdrawing fluid from the chamber to reciprocate the piston head therein.

References Cited

UNITED STATES PATENTS

| | | | |
|---|---|---|---|
| 1,826,021 | 10/1931 | Randall | 170—160.23 |
| 2,336,877 | 12/1943 | Matthews et al. | 170—135.75 |
| 2,559,767 | 7/1951 | Hatcher | 170—160.23 |
| 3,051,249 | 8/1962 | Dirlik | 170—160.32 |
| 3,148,735 | 9/1964 | Miller et al. | 170—160.32 |
| 3,208,389 | 9/1965 | Stefan | 103—98 |

FOREIGN PATENTS 887,634   8/1943   France.

EDGAR W. GEOGHEGAN, *Primary Examiner.*

EVERETTE A. POWELL, JR., MARTIN P. SCHWADRON, *Examiners.*